(12) United States Patent
Murata et al.

(10) Patent No.: US 11,273,779 B2
(45) Date of Patent: Mar. 15, 2022

(54) ABNORMALITY DETECTION DEVICE, METHOD FOR ABNORMALITY DETECTION, NON-TRANSITORY STORAGE MEDIUM FOR ABNORMALITY DETECTION, AND VEHICLE RECORDING DEVICE

(71) Applicant: JVCKENWOOD Corporation, Yokohama (JP)

(72) Inventors: Toshitaka Murata, Yokohama (JP); Keita Hayashi, Yokohama (JP); Yasuo Yamada, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 196 days.

(21) Appl. No.: 16/662,097

(22) Filed: Oct. 24, 2019

(65) Prior Publication Data
US 2020/0055476 A1    Feb. 20, 2020

Related U.S. Application Data

(63) Continuation of application No. PCT/JP2018/039324, filed on Oct. 23, 2018.

(30) Foreign Application Priority Data

Nov. 15, 2017 (JP) .............................. JP2017-220165

(51) Int. Cl.
*G08G 1/00*      (2006.01)
*B60R 25/32*     (2013.01)
(Continued)

(52) U.S. Cl.
CPC ........ *B60R 21/013* (2013.01); *G06K 9/00791* (2013.01); *G06K 9/00832* (2013.01); *G07C 5/0841* (2013.01); *B60R 2021/01302* (2013.01)

(58) Field of Classification Search
CPC ........ B60R 21/013; B60R 2021/01302; G06K 9/00791; G06K 9/00832; G07C 5/0841
See application file for complete search history.

(56) References Cited

U.S. PATENT DOCUMENTS

2007/0103279 A1    5/2007   Hayashi et al.
2008/0186153 A1    8/2008   Hayashi
(Continued)

FOREIGN PATENT DOCUMENTS

EP          2515079       10/2012
JP       2005-161996       6/2005
(Continued)

OTHER PUBLICATIONS

Extended European Search Report for European Patent Application No. 18879024.0 dated May 6, 2020.
(Continued)

*Primary Examiner* — Mathew Franklin Gordon
(74) *Attorney, Agent, or Firm* — Amin, Turocy & Watson, LLP

(57) ABSTRACT

There is provided an abnormality detection device includes a detector configured to detect a shake of a vehicle, a threshold setting unit configured to set at least one threshold for determining whether the detected shake of the vehicle is abnormal, a vehicle peripheral information acquisition unit configured to acquire at least one of a video around the vehicle, illuminance information around the vehicle, and sound information around the vehicle, and a vehicle information acquisition unit configured to acquire information about a driving state of the vehicle, wherein the threshold setting unit is further configured to control the at least one threshold based on the information acquired by the vehicle peripheral information acquisition unit, when the vehicle is (Continued)

determined to be being parked based on the information acquired by the vehicle information acquisition unit.

7 Claims, 6 Drawing Sheets

(51) Int. Cl.
    *G07C 5/00*     (2006.01)
    *B60R 21/013*     (2006.01)
    *G06K 9/00*     (2022.01)
    *G07C 5/08*     (2006.01)

(56) References Cited

U.S. PATENT DOCUMENTS

| | | |
|---|---|---|
| 2009/0121850 A1 | 5/2009 | Tanaka et al. |
| 2016/0152211 A1 | 6/2016 | Owens et al. |
| 2016/0280131 A1 | 9/2016 | Carson, Jr. |
| 2018/0050696 A1* | 2/2018 | Misu ................... A61B 5/0077 |
| 2019/0118751 A1* | 4/2019 | Ghannam ......... B60R 21/01336 |
| 2020/0198527 A1* | 6/2020 | Koehler ............... G08G 1/0133 |

FOREIGN PATENT DOCUMENTS

| | | |
|---|---|---|
| JP | 2006-235732 | 9/2006 |
| JP | 2007-011965 | 1/2007 |
| JP | 2007-161226 | 6/2007 |
| JP | 2008-189140 | 8/2008 |
| JP | 2010-128610 | 6/2010 |
| WO | 2017/013685 | 1/2017 |

OTHER PUBLICATIONS

International Search Report and Written Opinion for International Patent Application No. PCT/JP2018/039324 dated Jan. 15, 2019, 9 pages.

\* cited by examiner

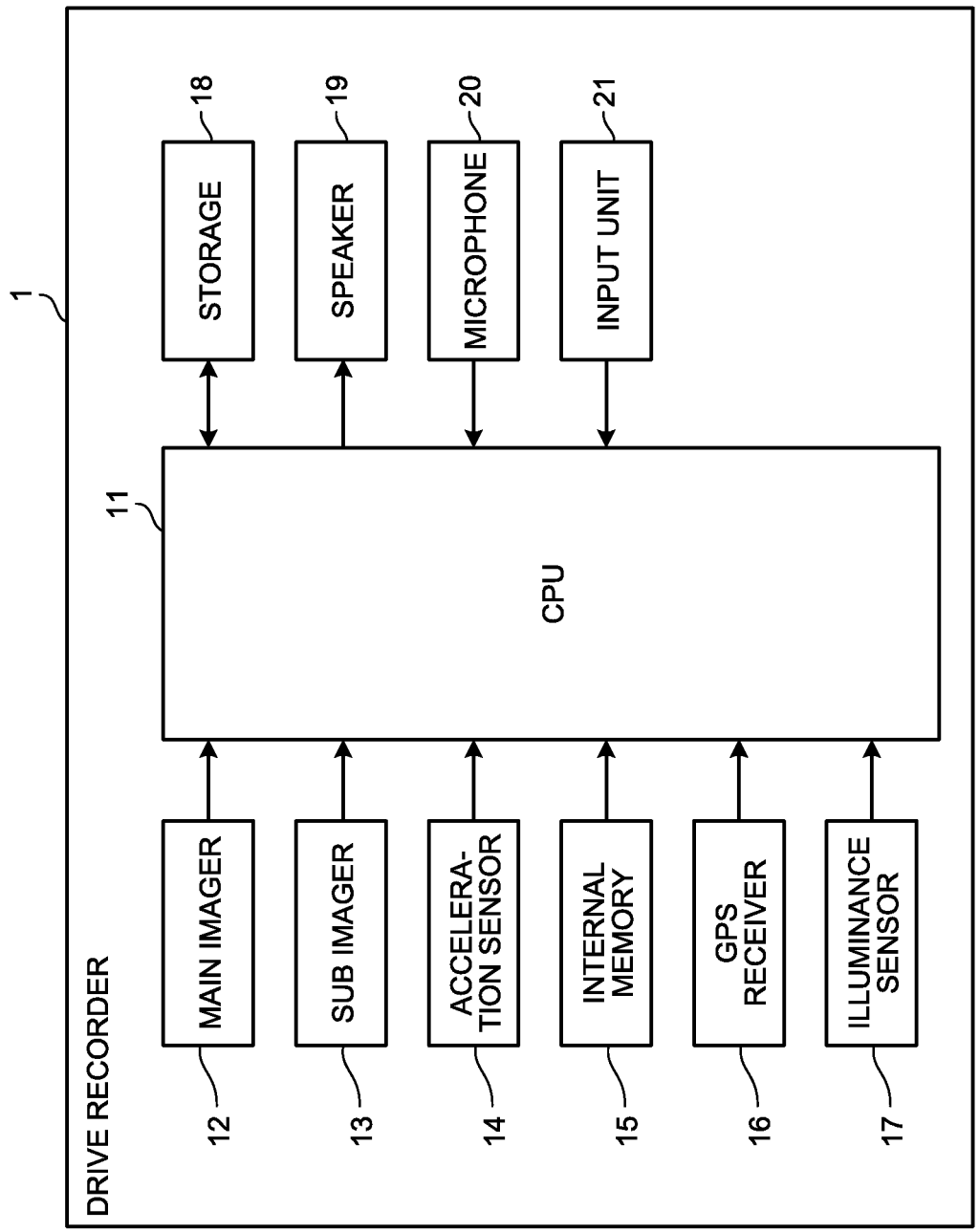

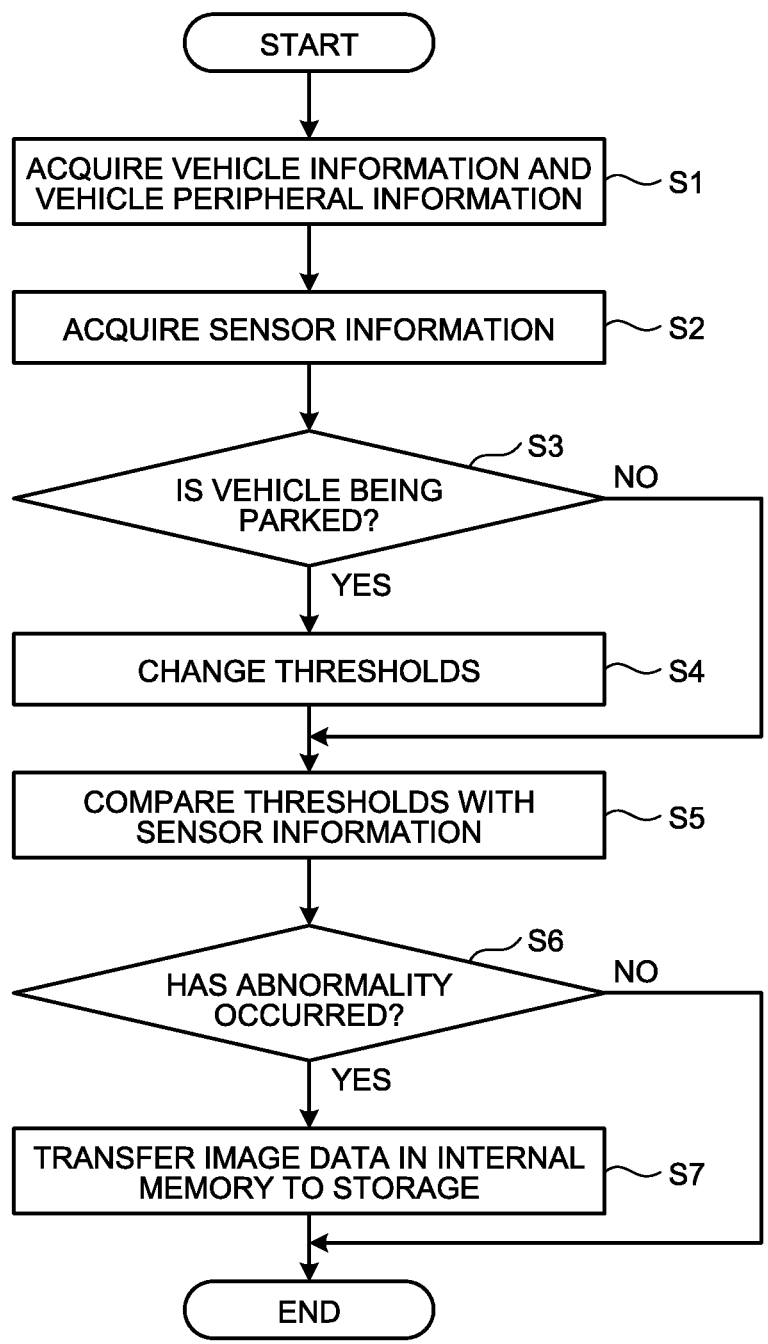

ABNORMALITY DETECTION DEVICE, METHOD FOR ABNORMALITY DETECTION, NON-TRANSITORY STORAGE MEDIUM FOR ABNORMALITY DETECTION, AND VEHICLE RECORDING DEVICE

CROSS-REFERENCE TO RELATED APPLICATIONS

This application is a continuation of PCT International Application No. PCT/JP2018/039324 filed in Japan on Oct. 23, 2018, which claims priority to and incorporates by references the entire contents of Japanese Patent Application No. 2017-220165 filed in Japan on Nov. 15, 2017.

FIELD

The present application relates to an abnormality detection device, a method for abnormality detection, a non-transitory storage medium for abnormality detection, and a vehicle recording device.

BACKGROUND

In recent years, drive recorders have been known that can detect and record an event/incident, such as some kind of impact to a vehicle during driving or parking.

For example, in a technique disclosed in Japanese Patent Application Laid-open No. 2010-128610, a determination threshold of an acceleration sensor is changed based on a change in a signal for detecting a parking state of a vehicle, and some kind of event is determined to have occurred when an output signal of the acceleration sensor has exceeded the determination threshold.

In a technique disclosed in Japanese Patent Application Laid-open No. 2005-161996, radio waves are emitted around a vehicle, and an abnormality is detected when a low frequency component of a reflected wave from a moving object has exceeded a predetermined level.

In a technique disclosed in Japanese Patent Application Laid-open No. 2007-161226, using an angular velocity sensor hardly susceptible to a shake of a vehicle caused by, for example, wind, an angular velocity of the vehicle in a direction orthogonal to a floor direction thereof is detected, and, based on the detected angular velocity signal, a determination is made as to whether the vehicle is being stolen.

SUMMARY

Although the technique disclosed in Patent Literature 1 is described such that the determination threshold of the acceleration sensor is changed based on the change in the signal for detecting the parking state of the vehicle, the threshold for detecting the event is not changeable according to a state of periphery of the vehicle.

Although the technique disclosed in Patent Literature 2 is described such that a monitoring area is optimized and a detection sensitivity is adjusted, the threshold for detecting the abnormal state is not controllable according to the state of the periphery of the vehicle.

In the technique disclosed in Patent Literature 3, the threshold for detecting whether the vehicle is being stolen is not controllable according to the state of the periphery of the vehicle.

An abnormality detection device, a method for abnormality detection, a non-transitory storage medium for abnormality detection, and a vehicle recording device are disclosed.

According to the present invention, there is provide an abnormality detection device comprising: a detector configured to detect a shake of a vehicle; a threshold setting unit configured to set at least one threshold for determining whether the detected shake of the vehicle is abnormal; a vehicle peripheral information acquisition unit configured to acquire at least one of a video around the vehicle, illuminance information around the vehicle, and sound information around the vehicle; and a vehicle information acquisition unit configured to acquire information about a driving state of the vehicle, wherein the threshold setting unit is further configured to control the at least one threshold based on the information acquired by the vehicle peripheral information acquisition unit when the vehicle is determined to be being parked based on the information acquired by the vehicle information acquisition unit.

According to the present invention, there is provide a method for abnormality detection comprising: detecting a shake of a vehicle; setting at least one threshold for determining whether the detected shake of the vehicle is abnormal; acquiring vehicle peripheral information by acquiring at least one of a video around the vehicle, illuminance information around the vehicle, and sound information around the vehicle; and acquiring vehicle information by acquiring information about a driving state of the vehicle, wherein the setting further comprising controlling the at least one threshold based on the information acquired at the acquiring of the vehicle peripheral information when the vehicle is determined to be being parked based on the vehicle information acquired at the acquiring of the vehicle information.

According to the present invention, there is provide a non-transitory storage medium for abnormality detection that stores a computer program to be executed on a computer of a vehicle recording device, the computer program causing the computer to execute: detecting a shake of a vehicle; setting at least one threshold for determining whether the detected shake of the vehicle is abnormal; acquiring vehicle peripheral information by acquiring at least one of a video around the vehicle, illuminance information around the vehicle, and sound information around the vehicle; and acquiring vehicle information by acquiring information about a driving state of the vehicle, wherein the setting further comprising controlling the at least one threshold based on the information acquired at the acquiring of the vehicle peripheral information when the vehicle is determined to be being parked based on the vehicle information acquired at the acquiring of the vehicle information.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 2 is a block diagram illustrating an example of a hardware configuration of the drive recorder illustrated in FIGS. 1A to 1C.

FIG. 6 is a flowchart illustrating an abnormality determination processing performed by the drive recorder illustrated in FIGS. 1A to 1C.

DETAILED DESCRIPTION OF THE PREFERRED EMBODIMENTS

The following describes an abnormality detection device, a method for abnormality detection, a non-transitory storage medium for abnormality detection, and a vehicle recording device according to an embodiment of the present application by way of an example of a case of implementing them in a drive recorder, with reference to FIGS. 1A to 6.

Hereinafter, in the present embodiment, examples of events to be detected as an abnormality include an impact caused by sudden starting, sudden braking, or sudden steering, while a vehicle is driving, and a collision action by another vehicle, an action in which the vehicle is damaged (an action in which a vehicle body is scraped by, for example, another vehicle or a cart, window glass is broken, a side mirror or a door contacts an obstacle, or a tire is punctured), and an action in which tires are stolen, while the vehicle is being parked. The event to be detected as the abnormality may, however, be an event other than the above-listed events.

Figure 1A:
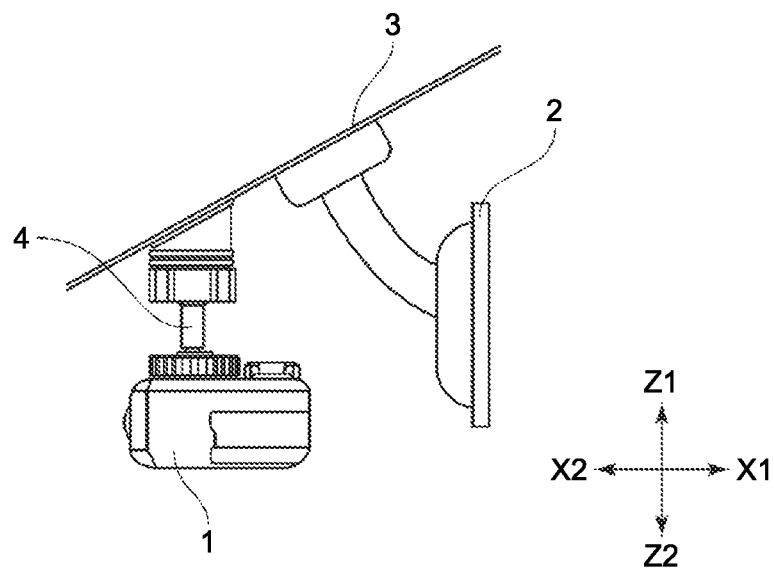
FIGS. 1A to 1C are schematic diagrams illustrating an external view and an installation example of a drive recorder (dashcam) according to an embodiment of the present application, FIG. 1A being the installation example, FIG. 1B being a front view, and FIG. 1C being a bottom plan view.
Figure 1B:
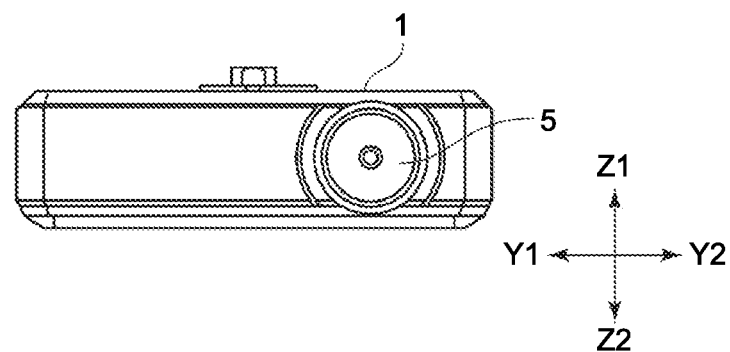
Figure 1C:
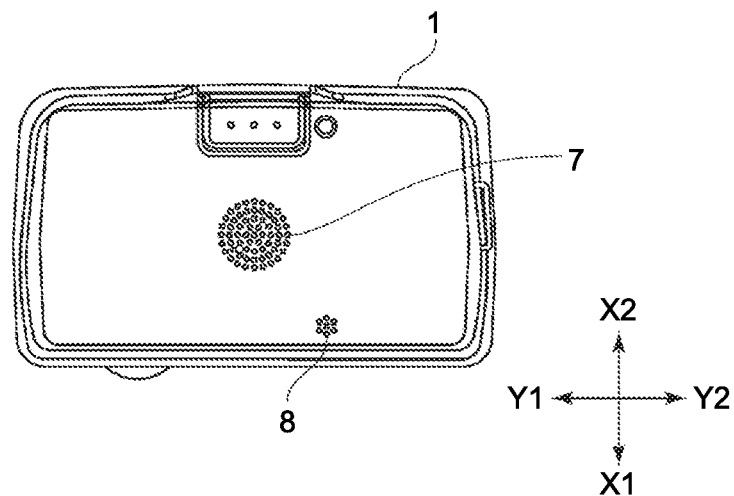

FIGS. 1A to 1C are schematic diagrams illustrating an external view and an installation example of a drive recorder 1 according to the embodiment of the present application, FIG. 1A being the installation example, FIG. 1B being a front view, and FIG. 1C being a bottom plan view. The drive recorder 1 is a unit for recording image data (for example, video data and driving data) representing driving conditions of the vehicle. As illustrated in FIG. 1A, the drive recorder 1 is mounted on a windshield 3 with a mounting base 4 interposed therebetween on a back of a rearview mirror 2 of the vehicle. In the following description, an X1 direction denotes a direction toward the rearview mirror 2 as viewed from the drive recorder 1, and an X2 direction denotes a direction opposite to the X1 direction. On a Z-axis orthogonal to a plane of X1 and X2, a Z1 direction denotes a direction toward the windshield 3 as viewed from the drive recorder 1 and the rearview mirror 2, and a Z2 direction denotes a direction opposite to the Z1 direction.

As illustrated in FIG. 1B, the drive recorder 1 is provided at the front thereof with a camera lens 5. The camera lens 5 captures an image in front (in the X2 direction) of the vehicle. In FIG. 1B, a Y2 direction denotes a direction from the center of the drive recorder toward the camera lens 5, and a Y1 direction denotes a direction opposite to the Y2 direction. As illustrated in FIG. 1C, the drive recorder 1 is provided on a back side thereof with a microphone unit 7 and a speaker unit 8.

FIG. 2 is a block diagram illustrating an example of a hardware configuration of the drive recorder 1 illustrated in FIGS. 1A to 1C. As illustrated in FIG. 2, the drive recorder 1 includes a central processing unit (CPU) 11, a main imager 12, a sub imager 13, an acceleration sensor 14, an internal memory 15, a global positioning system (GPS) receiver 16, an illuminance sensor 17, a storage 18, a speaker 19, a microphone 20, and an input unit 21.

The CPU 11 operates according to a control program and control data stored in the internal memory 15, and controls the units of the drive recorder 1 in an integrated manner. The CPU 11 executes the control program stored in the internal memory 15 to perform functions described later.

The main imager 12 is a camera that includes the camera lens 5 illustrated in FIG. 1B, and is provided with, for example, a charge-coupled device (CCD) sensor or a complementary metal-oxide-semiconductor (CMOS) sensor.

The sub imager 13 is a camera provided with, for example, a CMOS sensor capable of imaging 360 degrees around itself.

The acceleration sensor 14 is, for example, a sensor that detects acceleration in the directions of three axes of the x-axis, y-axis, and z-axis, and detects a change in physical location of the drive recorder 1. The acceleration sensor 14 serves as a detector for detecting a shake of the vehicle.

The internal memory 15 is constituted by, for example, a read-only memory (ROM) and a random access memory (RAM). The ROM is used as a storage area for the control program (not illustrated) to be executed by the CPU 11. The RAM is used as a work area for the CPU 11, and also used as a buffer area for temporarily storing the image data (image data 15A in FIG. 4 described later) for a predetermined period of time (several seconds to several minutes).

The GPS receiver 16 receives GPS signals transmitted from GPS satellites (not illustrated). The CPU 11 performs a positioning calculation processing based on the received GPS signals, and can detect position information including a latitude, a longitude, and a altitude of the drive recorder 1 at the current time. The GPS receiver 16 may receive GPS signals included in another device, such as a vehicle navigation device (not illustrated).

The illuminance sensor 17 detects illuminance information (brightness) around the vehicle.

The storage 18 is, for example, a secure digital (SD) memory card, and is a flash memory capable of recording the image data captured by the main imager 12.

The speaker 19 includes the speaker unit 8 of FIG. 1C, and can output, for example, a sound reproduced from a recorded file, an audio guide, and an operation sound.

The microphone 20 includes the microphone unit 7 of FIG. 1C, and can record surrounding sounds during video recording.

The input unit 21 is an interface that includes physical operation buttons (not illustrated), and is used to enter various types of information into the CPU 11.

Figure 3:
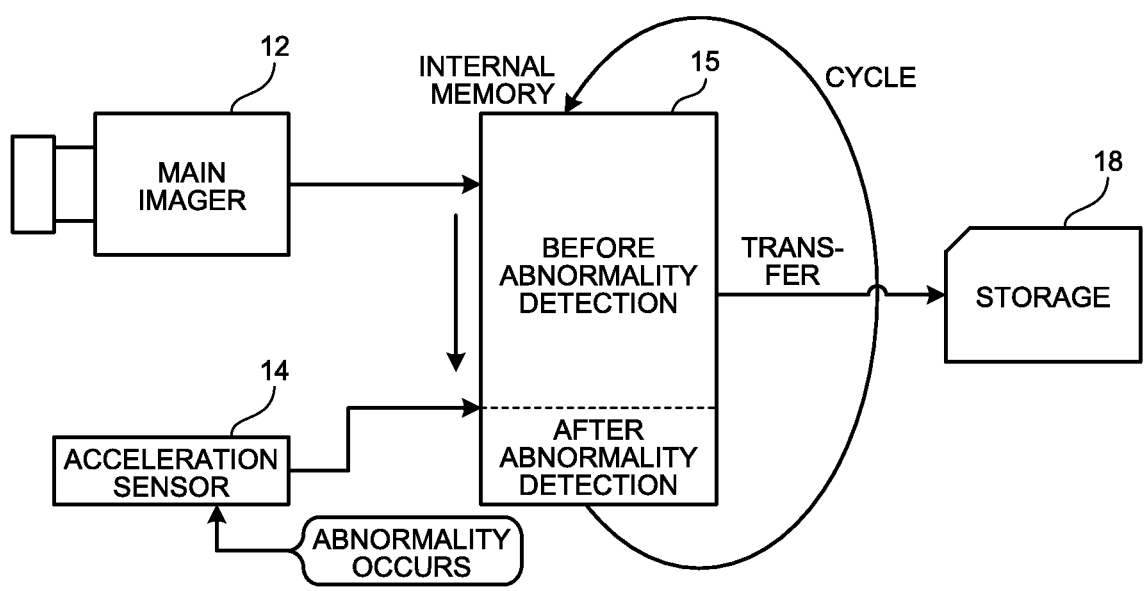
FIG. 3 is a diagram depicting an illustration of a normal recording operation when the drive recorder illustrated in FIGS. 1A to 1C and 2 detects an abnormality.

The following describes a recording operation of the drive recorder 1 illustrated in FIGS. 1A to 1C and 2. FIG. 3 is a diagram depicting an illustration of a normal recording operation when the drive recorder 1 illustrated in FIGS. 1A to 1C and 2 detects the abnormality. As illustrated in FIG. 3, the image data (image data 15A in FIG. 4 described later) captured by the main imager 12 is cyclically recorded in an area for recording the abnormality (abnormality recording area 48 of FIG. 4 described later) in the internal memory 15. In other words, when the image data 15A has been sequentially recorded from the first logical address (or physical address) to the last logical address (or physical address) in the internal memory 15, the recording start position returns to the first logical address (or physical address), and the image data is overwritten as it is. When at least one value detected by the acceleration sensor 14 exceeds at least one predetermined threshold while such a cyclical recording method is executed, the value is detected to be abnormal by the control of the CPU 11, and the image data for predetermined periods before and after the time of the detection is transferred to the storage 18 based on the control of the CPU 11. The image data before and after the abnormality detection is recorded by this transfer in the storage 18 in which overwriting is prohibited.

Figure 4:
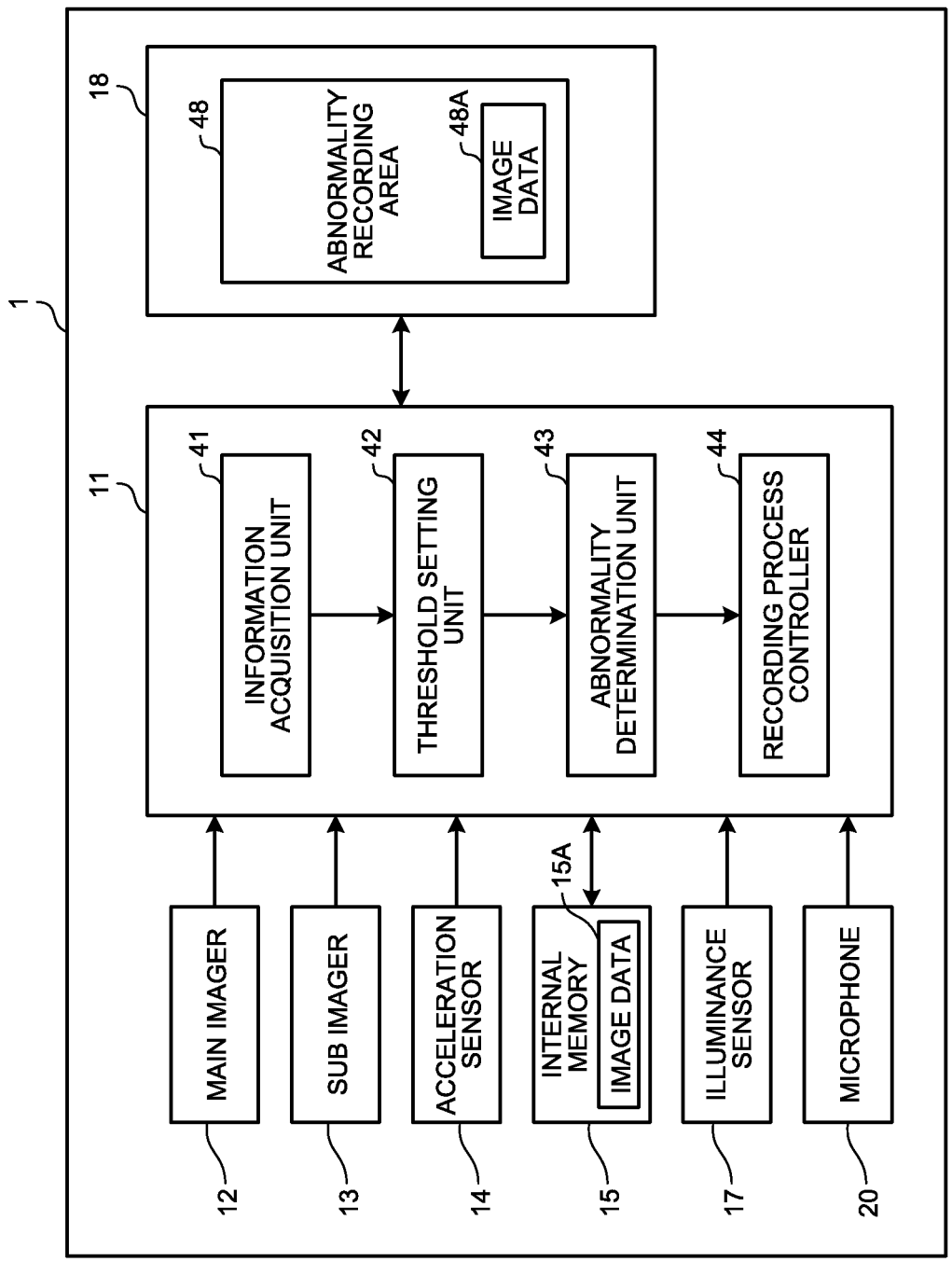
FIG. 4 is a diagram illustrating an example of a functional configuration of the drive recorder illustrated in FIGS. 1A to 1C.

The following describes the functions included in the drive recorder 1. FIG. 4 is a diagram explaining configurations of the drive recorder 1 illustrated in FIGS. 1A to 1C in more detail for each of the functions of the present application. The CPU 11 of the drive recorder 1 is configured by including the functions of an information acquisition unit 41, a threshold setting unit 42, an abnormality determination unit 43, and a recording process controller 44. The storage 18 has the abnormality recording area 48 for recording image data 48A. The drive recorder 1 may include functions other than the above-mentioned functions.

The information acquisition unit 41 acquires vehicle peripheral information including the surrounding video captured by the sub imager 13, the surrounding illuminance information detected by the illuminance sensor 17, and the surrounding sound information detected by the microphone 20. The information acquisition unit 41 also acquires vehicle information including, for example, gear information and engine off information through, for example, a controller area network (CAN). The vehicle peripheral information and the vehicle information thus acquired are supplied to the threshold setting unit 42. The information acquisition unit 41 serves as a vehicle peripheral information acquisition unit for acquiring the vehicle peripheral information and a vehicle information acquisition unit for acquiring information about a driving state of the vehicle.

The threshold setting unit 42 determines whether the vehicle is being parked based on the vehicle information supplied from the information acquisition unit 41, and when the vehicle is determined to be being parked, changes preset thresholds based on the vehicle peripheral information supplied from the information acquisition unit 41 such that the abnormality can be more easily determined to have occurred.

More specifically, when the vehicle peripheral information supplied from the information acquisition unit 41 is the sound information around the vehicle detected by the microphone 20 and the sound volume of the acquired sound is equal to or lower than a predetermined value A1, or equal to or higher than another predetermined value A2 that has been separately set from the predetermined value A1, the threshold setting unit 42 changes the thresholds such that the abnormality can be more easily determined to have occurred. When the threshold setting unit 42 determines a human voice from the acquired sound information, and when the sound volume of the human voice is equal to or lower than a predetermined value A3, the threshold setting unit 42 changes the threshold such that the abnormality can be more easily determined to have occurred. Furthermore, when the threshold setting unit 42 determines a number of people who have produced voices from the acquired human voices and the number of the people who have produced the voices is equal to or lower than a predetermined value A4, the threshold setting unit 42 changes the threshold such that the abnormality can be more easily determined to have occurred.

As described above, the threshold setting unit 42 has a function as a voice determination unit for determining the human voice from the sound information included in the vehicle peripheral information and a function as a number of people determination unit for determining the number of the people who have produced the voices from the determined human voices.

When the vehicle peripheral information supplied from the information acquisition unit 41 is the illuminance information around the vehicle detected by the illuminance sensor 17 and the acquired illuminance information is equal to or lower than a predetermined value B, the threshold setting unit 42 changes the threshold such that the abnormality can be more easily determined to have occurred.

In addition, when the vehicle peripheral information supplied from the information acquisition unit 41 is the video around the vehicle captured by the sub-imager 13 and motion information that is a processing result obtained by known motion detection processing on the acquired captured video is equal to or higher than a predetermined value C, the threshold setting unit 42 changes the threshold such that the abnormality can be more easily determined to have occurred.

The abnormality determination unit 43 compares sensor information supplied from the acceleration sensor 14 with the threshold set by the threshold setting unit 42, and determines whether an abnormality needed to be recorded in the abnormality recording area 48 of the storage 18 has occurred, that is, whether the sensor output value detected by the acceleration sensor 14 has exceeded the threshold. The abnormality determination unit 43 supplies the determination result to the recording process controller 44.

When the result of the determination supplied from the abnormality determination unit 43 is that an abnormality has occurred, the recording process controller 44 transfers the image data 15A for the predetermined periods of time before and after the time of the determination of the abnormality from the internal memory 15 to the storage 18 to record the image data 15A as the image data 48A.

The abnormality recording area 48 is a storage area of the storage 18 in which overwriting is prohibited. The image data 15A for the predetermined periods of time in which the recording process controller 44 has determined that the abnormality has occurred is transferred from the internal memory 15, and stored as the image data 48A in the abnormality recording area 48.

Figure 5A:
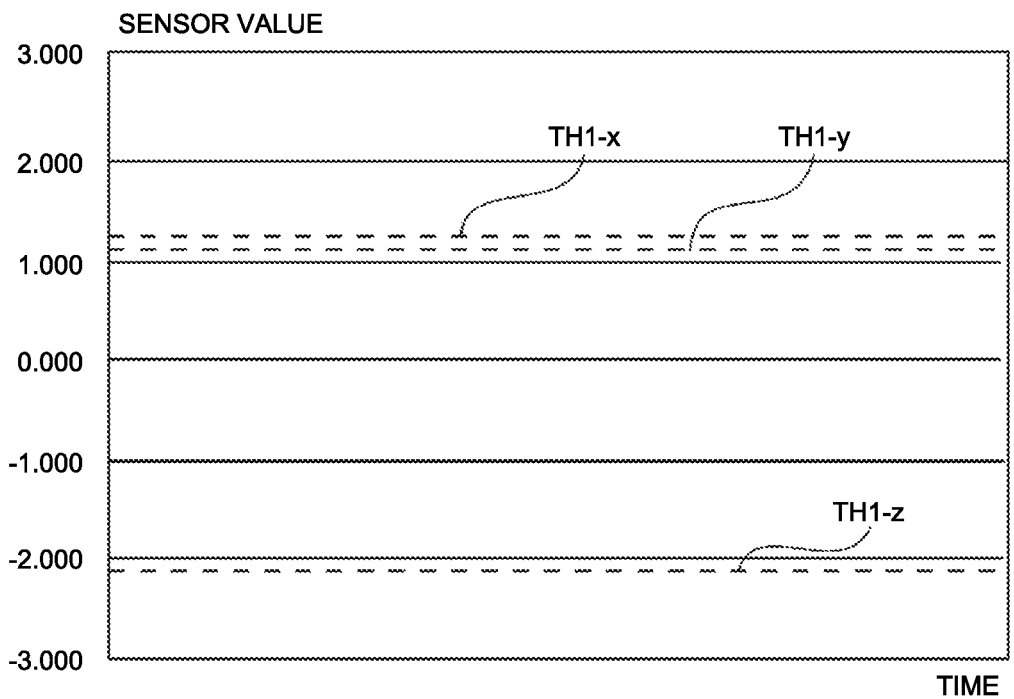
FIGS. 5(A) and 5(B) are diagrams for explaining examples of setting thresholds, FIG. 5(A) being a diagram illustrating examples of the thresholds during driving, and FIG. 5(B) being a diagram illustrating examples of the thresholds during parking.
Figure 5B:
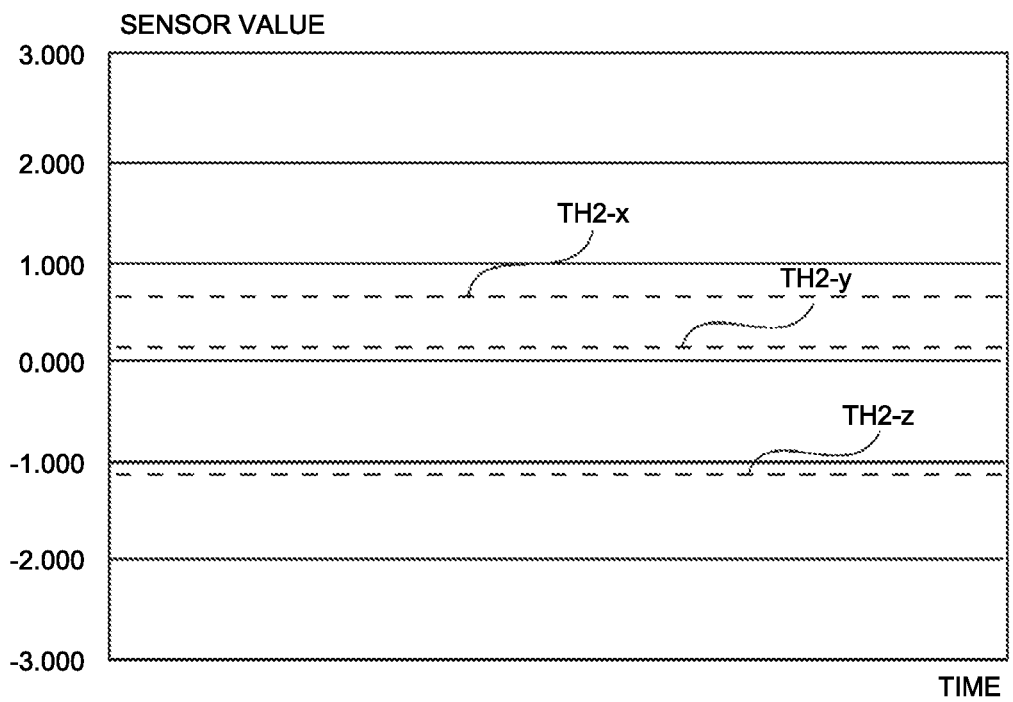

The following describes examples of the thresholds set by the threshold setting unit 42. FIGS. 5(A) and 5(B) are diagrams illustrating examples of the thresholds, FIG. 5(A) illustrating examples of the thresholds during driving, and FIG. 5(B) illustrating examples of the thresholds during parking. In FIGS. 5(A) and 5(B), the horizontal axis represents time, and the vertical axis represents the sensor value. TH1-x and TH2-x denote thresholds for a value in the X-axis direction among the sensor output values output from the acceleration sensor 14. TH1-y and TH2-y denote thresholds for a value in the Y-axis direction among the sensor output values output from the acceleration sensor 14. TH1-z and TH2-z denote thresholds for a value in the Z-axis direction among the sensor output values output from the acceleration sensor 14.

As can be seen from the thresholds illustrated in FIGS. 5(A) and 5(B), the values of the thresholds are different between those during driving and those during parking.

During driving, when, among the sensor output values detected by the acceleration sensor 14, the sensor output value in the X-axis direction is equal to or higher than the threshold TH1-x, or when the sensor output value in the Y-axis direction is equal to or higher than the threshold TH1-y, or when the sensor output value in the Z-axis direction is equal to or higher than the threshold TH1-z, an abnormality can be determined to have occurred. During parking, when, among the sensor output values detected by the acceleration sensor 14, the sensor value in the X-axis direction is equal to or higher than the threshold TH2-x, or when the sensor output value in the Y-axis direction is equal to or higher than the threshold TH2-y, or when the sensor output value in the Z-axis direction is equal to or higher than the threshold TH2-z, an abnormality can be determined to have occurred.

In other words, during driving, the relatively high threshold TH1 for the sensor output value of the acceleration sensor 14 is set such that an abnormality (large change), such as a collision (accident) or sudden braking, can be detected, whereas during parking, the threshold TH2 that makes determination of abnormality easier is set such that an abnormality (slight change), such as a vehicle break-in or mischief, can be accurately detected. In particular, among the sensor output values detected by the acceleration sensor 14, the amount of reduction or the amount of change in the threshold TH2-y for the sensor output value in the Y-axis direction and in the threshold TH2-z for the sensor output value in the Z-axis direction is set greater than the amount of reduction or the amount of change in the threshold TH2-x for the sensor output value in the X-axis direction. This setting can increase sensitivity of abnormality detection in the right-left direction and the up-down direction, so that the abnormality can be accurately detected and recorded even if the vehicle suffers damage, such as the vehicle break-in or the mischief.

The following describes abnormality determination processing performed by the CPU 11 of the drive recorder 1 illustrated in FIGS. 1A to 1C, with reference to a flowchart of FIG. 6.

At Step S1, the information acquisition unit 41 acquires the vehicle information including the gear information and the engine off information through the CAN, and acquires the vehicle peripheral information including the video around the vehicle captured by the sub imager 13, the illuminance information around the vehicle detected by the illuminance sensor 17, and the sound information around the vehicle detected by the microphone 20.

At Step S2, the abnormality determination unit 43 acquires the sensor information supplied from the acceleration sensor 14.

At Step S3, the threshold setting unit 42 determines whether the vehicle is being parked based on the vehicle information acquired at Step S1, and, when the vehicle is determined to be being parked (Yes at Step S3), the threshold setting unit 42 performs a processing at Step S4 to change the thresholds based on the vehicle peripheral information acquired at Step S1 such that the abnormality can be more easily determined to have occurred. This change allows the abnormality to be accurately detected even if the vehicle suffers damage, such as the vehicle break-in or the mischief.

In contrast, when, at Step S3, the vehicle is determined not to be being parked (No at Step S3), the threshold setting unit 42 skips the processing at Step S4, and performs a processing at Step S5.

At Step S5, the abnormality determination unit 43 compares the sensor information acquired at step S2 with the thresholds set by the threshold setting unit 42, and supplies the comparison results to the recording process controller 44.

At Step S6, the recording process controller 44 determines whether an abnormality has occurred based on the comparison results supplied from the abnormality determination unit 43, and, when the abnormality is determined to have occurred (Yes at Step S6), the recording process controller 44 performs a processing at Step S7 to transfer the image data 15A for the predetermined periods of time before and after the time of the determination of the abnormality from the internal memory 15 to the storage 18. The image data 48A before and after the abnormality detection is recorded in the storage 18 by this transfer.

In contrast, when, at Step S6, the recording process controller 44 determines from the comparison results supplied from the abnormality determination unit 43 that no abnormality has occurred (No at Step S6), the recording process controller 44 performs control not to transfer the image data to the storage 18.

As can be understood from the above description, the drive recorder 1 includes the detector (acceleration sensor 14) that detects the shake of the vehicle, the threshold setting unit 42 that sets the thresholds for determining whether the output values of the detector is abnormal, the vehicle peripheral information acquisition unit (information acquisition unit 41) that acquires at least one of the video around the vehicle, the illuminance information around the vehicle, and the sound information around the vehicle, and the vehicle information acquisition unit (information acquisition unit 41) that acquires the information about the driving state of the vehicle, and controls the thresholds based on the vehicle peripheral information when the vehicle is determined to be being parked based on the vehicle information. Therefore, the abnormality can be accurately detected according to the state of the periphery of the vehicle.

The outputs of the detector are the sensor output values in the front-rear direction, the right-left direction, and the up-down direction with respect to the vehicle, and the amount of reduction in the threshold in the right-left direction and the amount of reduction in the threshold in the up-down direction with respect to the vehicle are greater than the amount of reduction in the threshold in the front-rear direction with respect to the vehicle. Therefore, the abnormality can be accurately detected even if the vehicle suffers damage, such as the vehicle break-in or the mischief.

When the illuminance information around the vehicle included in the vehicle peripheral information is equal to or lower than the predetermined value, the threshold is changed such that the abnormality can be more easily determined to have occurred. Therefore, the abnormality can be more accurately detected when the vehicle is being parked and the periphery thereof is dark, and accordingly, the video can be recorded more easily to capture an evidence video in situations where the vehicle break-in or the mischief is likely to occur.

When the sound volume of the sound around the vehicle included in the vehicle peripheral information is equal to or lower than the predetermined value, or equal to or higher than the other predetermined value that has been separately set from the predetermined value, the thresholds are changed such that the abnormality can be more easily determined to have occurred. Therefore, the abnormality can be accurately detected in situations where the vehicle is being parked and the periphery of the vehicle is quieter or louder than a predetermined range, and accordingly, the video can be recorded more easily to capture the evidence video in situations where the vehicle break-in or the mischief is likely to occur.

The human voice is determined from the sound information included in the vehicle peripheral information, and, when the sound volume of the human voice is equal to or lower than the predetermined value, the threshold is changed such that the abnormality can be more easily determined to have occurred. Therefore, the abnormality can be accurately detected in situations where the vehicle is being parked, and a suspicious person talking in a low voice is present at the periphery of the vehicle or only few people are present around the vehicle, and accordingly, the video can be recorded more easily to capture the evidence video in situations where the vehicle break-in or the mischief is likely to occur.

The number of people who have produced voices is determined from the human voices included in the vehicle peripheral information, and, when the number of the people who have produced the voices is equal to or smaller than the predetermined value, the threshold is changed such that the abnormality can be more easily determined to have occurred. Therefore, the abnormality can be accurately detected in situations where the vehicle is being parked and a suspicious person may be present at the periphery of the vehicle, and accordingly, the video can be recorded more easily to capture the evidence video in situations where the vehicle break-in or the mischief is likely to occur.

The drive recorder 1 is further provided with the imager (main imager 12) that outputs the captured image as the image data, the abnormality determination unit 43 that compares the sensor output values detected by the detector (acceleration sensor 14) with the threshold set by the threshold setting unit 42 and determines whether an abnormality has occurred, and the recording process controller 44 that records the image data output from the imager in the storage 18 when the abnormality determination unit 43 determines that the abnormality has occurred. Therefore, the image data before and after the abnormality detection can be recorded.

In the above description, the vehicle peripheral information is acquired from the sub imager 13, the illuminance sensor 17, and the microphone 20 provided in the drive recorder 1. The vehicle peripheral information may, however, be acquired from, for example, an imager, an illuminance sensor, and a microphone (which are not illustrated) mounted on the vehicle. In other words, by not being provided with the sub imager 13, the illuminance sensor 17, and the microphone 20, the drive recorder 1 can be reduced in size, and the present application can be implemented with a simple configuration.

As described above, the functions of the drive recorder 1 may or may not be all in the same housing. For example, some of the functions of the abnormality detection device including the acceleration sensor 14, the threshold setting unit 42, and the information acquisition unit 41 may be housed in a housing different from the drive recorder 1. Also, in addition to the functions of the abnormality detection device, for example, some of the functions of the vehicle recording device including the main imager 12, the abnormality determination unit 43, and the recording process controller 44 may be housed in a housing different from the drive recorder 1.

While the embodiment of the present application has been described, the present application is not limited to the embodiment described above, and can be variously modified within a scope not deviating from the gist of the present application. For example, although the thresholds during parking are changed in the abnormality determination processing illustrated in FIG. 6, the present application is not limited thereto. When the vehicle is determined to be located at a usually used carwash based on position information detected by the GPS receiver 16, the abnormality determination processing may be temporarily halted without changing the thresholds during parking. When each parking lot has a specific shake characteristic, the setting of the thresholds for determination of abnormality may be changeable for each parking lot. Since the illuminance and the surrounding sound volume differs in each parking lot, the thresholds for the illuminance and the sound volume for changing the thresholds for determining the abnormality may be set for each parking lot. With the configuration obtained by combining the position information by the GPS with the present application as described above, the accuracy of abnormality detection can be improved.

In the above description, as illustrated in FIG. 5(A), during driving, the threshold TH1-x for the sensor output value in the X-axis direction is approximately equal to the threshold TH1-y for the sensor output value in the Y-axis direction, and the threshold TH1-z for the sensor output value in the Z-axis direction is set to a relatively high value. As illustrated in FIG. 5(B), during parking, the amount of reduction in the threshold TH2-y for the sensor output value in the Y-axis direction and the threshold TH2-z for the sensor output value in the Z-axis direction is set greater than the amount of reduction in the threshold TH2-x for the sensor output value in the X-axis direction. The present application is not limited to this setting. For example, the threshold TH1-x for the sensor output value in the X-axis direction may be set higher than the threshold TH1-y for the sensor output value in the Y-axis direction and the threshold TH1-z for the sensor output value in the Z-axis direction, and the thresholds TH2 for the sensor output values along the respective axes may be set to the same level during parking. With these settings, during driving, abnormalities, such as a collision and sudden braking in particular, can be easily detected without detecting, as an abnormality, for example, behavior of the vehicle body caused by a normal steering operation or braking operation or vibration of the vehicle body caused by road surface irregularities, and during parking, even a slight change (abnormality) can be detected.

The series of processing described above can be performed by hardware or software. When the series of processing is performed by software, a computer program constituting the software is installed from a program recording medium to a computer incorporated in dedicated hardware, or, for example, to a general-purpose personal computer capable of executing various functions by installing various computer programs.

The program executed by the computer may be a program that performs processing in chronological order according to the order described in this specification, or a program that performs processing in parallel or at necessary time when, for example, calling is made.

The present application can provide an abnormality detection device, a method for abnormality detection, a non-transitory storage medium for abnormality detection, and a vehicle recording device that are capable of controlling thresholds for detecting abnormality according to a state of periphery of a vehicle.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An abnormality detection device comprising:
    a detector configured to detect a shake of a vehicle;
    a vehicle peripheral information acquisition unit configured to acquire at least one of a video around the vehicle, illuminance information around the vehicle, and sound information around the vehicle;
    a vehicle information acquisition unit configured to acquire information about a driving state of the vehicle;
    a threshold setting unit configured to set at least one threshold for determining whether the detected shake of the vehicle is abnormal, and configured to change the at least one threshold based on the information acquired by the vehicle peripheral information acquisition unit when the vehicle is determined to be being parked based on the information about the driving state of the vehicle acquired by the vehicle information acquisition unit; and
    an abnormality determination unit configured to determine an abnormality based on sensor output values of the shake of the vehicle detected by the detector and compared with the at least one threshold set by the threshold setting unit, wherein
    the threshold setting unit is further configured to change the at least one threshold such that the abnormality is more easily determinable to have occurred in situations where a vehicle break-in or a mischief is likely to occur based on the information acquired by the vehicle peripheral information acquisition unit, wherein
    the vehicle break-in or the mischief is likely to occur when the vehicle peripheral information is the illuminance information around the vehicle and the acquired illuminance information is equal to or lower than a predetermined value,
    the vehicle break-in or the mischief is likely to occur when the vehicle peripheral information is the sound information around the vehicle and a sound volume of the acquired sound is equal to or lower than a predetermined value or equal to or higher than another predetermined value that has been separately set from the predetermined value, and
    when the vehicle peripheral information is the video around the vehicle and motion information that is a processing result obtained by known motion detection processing on the acquired captured video is equal to or higher than a predetermined value.

2. The abnormality detection device according to claim 1, wherein
    the detector is further configured to detect the shake of the vehicle in a front-rear direction, a right-left direction, and an up-down direction with respect to the vehicle, and
    the threshold setting unit is further configured to set an amount of change in the threshold for determining whether the shake of the vehicle in the right-left direction with respect to the vehicle is abnormal and an amount in change of the threshold for determining whether the shake of the vehicle in the up-down direction with respect to the vehicle is abnormal greater than an amount of change in the threshold for determining whether the shake of the vehicle in the front-rear direction with respect to the vehicle is abnormal when the vehicle is determined to be being parked.

3. The abnormality detection device according to claim 1, wherein
    the vehicle peripheral information acquisition unit further comprises a voice determination unit configured to determine human voice based on the acquired sound information, and
    the threshold setting unit is further configured to change the at least one threshold such that the abnormality is more easily determinable to have occurred when the sound volume of the acquired sound is equal to or lower than the predetermined value.

4. The abnormality detection device according to claim 3, wherein
    the vehicle peripheral information acquisition unit further comprises a number of people determination unit configured to determine a number of people who have produced voices based on the acquired human voice, and
    the threshold setting unit is further configured to change the at least one threshold such that the abnormality is more easily determinable to have occurred when the acquired number of people is equal to or smaller than a predetermined value.

5. A vehicle recording device comprising:
    the abnormality detection device according to claim 1;
    an imager configured to output an image obtained by capturing at least one of an outside and an inside of the vehicle as image data;
    an abnormality determination unit configured to compare sensor output values detected by the detector in the abnormality detection device with the at least one threshold set by the threshold setting unit in the abnormality detection device and to determine whether an abnormality has occurred; and
    a recording process controller configured to record the image data output from the imager in a storage when the abnormality determination unit determines that the abnormality has occurred.

6. A method for abnormality detection comprising:
    detecting a shake of a vehicle by a detector;
    acquiring vehicle peripheral information by acquiring at least one of a video around the vehicle, illuminance information around the vehicle, and sound information around the vehicle; and
    acquiring vehicle information by acquiring information about a driving state of the vehicle;
    setting at least one threshold for determining whether the detected shake of the vehicle is abnormal;
    changing the at least one threshold based on the vehicle peripheral information when the vehicle is determined to be being parked based on the information about the driving state of the vehicle; and
    determining an abnormality based on sensor output values of the shake of the vehicle detected by the detector and compared with the at least one threshold set by the threshold setting unit, wherein
    changing the at least one threshold such that the abnormality is more easily determinable to have occurred in situations where a vehicle break-in or a mischief is likely to occur based on the vehicle peripheral information, wherein
    the vehicle break-in or the mischief is likely to occur when the vehicle peripheral information is the illuminance information around the vehicle and the acquired illuminance information is equal to or lower than a predetermined value,
    the vehicle break-in or the mischief is likely to occur when the vehicle peripheral information is the sound information around the vehicle and a sound volume of the acquired sound is equal to or lower than a predetermined value or equal to or higher than another predetermined value that has been separately set from the predetermined value, and the vehicle break-in or the mischief is likely to occur when the vehicle peripheral information is the video around the vehicle and motion information that is a processing result obtained by known motion detection processing on the acquired captured video is equal to or higher than a predetermined value.

7. A non-transitory storage medium for abnormality detection that stores a computer program to be executed on a computer of a vehicle recording device, the computer program causing the computer to execute:

detecting a shake of a vehicle by a detector;

acquiring vehicle peripheral information by acquiring at least one of a video around the vehicle, illuminance information around the vehicle, and sound information around the vehicle;

acquiring vehicle information by acquiring information about a driving state of the vehicle;

setting at least one threshold for determining whether the detected shake of the vehicle is abnormal;

changing the at least one threshold based on the vehicle peripheral information when the vehicle is determined to be being parked based on the information about the driving state of the vehicle; and determining an abnormality based on sensor output values of the shake of the vehicle detected by the detector and compared with the at least one threshold set by the threshold setting unit, wherein changing the at least one threshold such that the abnormality is more easily determinable to have occurred in situations where a vehicle break-in or a mischief is likely to occur based on the vehicle peripheral information, wherein the vehicle break-in or the mischief is likely to occur when the vehicle peripheral information is the illuminance information around the vehicle and the acquired illuminance information is equal to or lower than a predetermined value, the vehicle break-in or the mischief is likely to occur when the vehicle peripheral information is the sound information around the vehicle and a sound volume of the acquired sound is equal to or lower than a predetermined value or equal to or higher than another predetermined value that has been separately set from the predetermined value, and the vehicle break-in or the mischief is likely to occur when the vehicle peripheral information is the video around the vehicle and motion information that is a processing result obtained by known motion detection processing on the acquired captured video is equal to or higher than a predetermined value.

* * * * *